(12) United States Patent  (10) Patent No.: US 8,144,695 B2
Bakker et al.  (45) Date of Patent: Mar. 27, 2012

(54) SYSTEM AND METHOD FOR CONFIGURING AND EXECUTING COMMUNICATION DIVERSION WITH A GLOBALLY ROUTABLE USER AGENT UNIFORM RESOURCE IDENTIFIER

(75) Inventors: John-Luc Bakker, Keller, TX (US); Adrian Buckley, Tracy, CA (US)

(73) Assignee: Research in Motion Limited, Waterloo, Ontario (CA)

( * ) Notice: Subject to any disclaimer, the term of this patent is extended or adjusted under 35 U.S.C. 154(b) by 480 days.

(21) Appl. No.: 12/189,679

(22) Filed: Aug. 11, 2008

(65) Prior Publication Data

US 2009/0041018 A1  Feb. 12, 2009

Related U.S. Application Data

(60) Provisional application No. 60/955,272, filed on Aug. 10, 2007, provisional application No. 60/979,018, filed on Oct. 10, 2007, provisional application No. 60/985,902, filed on Nov. 6, 2007.

(51) Int. Cl.
| | |
|---|---|
| H04L 12/66 | (2006.01) |
| H04L 12/28 | (2006.01) |
| H04L 12/56 | (2006.01) |
| G06F 15/16 | (2006.01) |
| G06F 15/173 | (2006.01) |

(52) U.S. Cl. ......... 370/352; 370/392; 709/228; 709/238
(58) Field of Classification Search .............. 370/392
See application file for complete search history.

(56) References Cited

U.S. PATENT DOCUMENTS

| | | | |
|---|---|---|---|
| 2006/0018272 A1* | 1/2006 | Mutikainen et al. | 370/328 |
| 2006/0136557 A1* | 6/2006 | Schaedler et al. | 709/203 |
| 2007/0153777 A1* | 7/2007 | Coulas et al. | 370/356 |
| 2008/0089290 A1 | 4/2008 | Coulas et al. | |
| 2008/0089308 A1 | 4/2008 | Jentz et al. | |
| 2008/0092224 A1 | 4/2008 | Coulas et al. | |
| 2008/0226050 A1* | 9/2008 | Leppisaari et al. | 379/202.01 |
| 2008/0294783 A1* | 11/2008 | Shen et al. | 709/228 |

FOREIGN PATENT DOCUMENTS

WO  2006011017 A1  2/2006

OTHER PUBLICATIONS

Rosenberg, Obtaining and Using Globally Routable User Agent (UA) URIs (GRUU) in the Session Initiation Protocol (SIP), Oct. 23, 2006, The Internet Society.*

Buckley, Adrian et al.; U.S. Appl. No. 12/197,782, filed Aug. 25, 2008; Title: "System and Method for Managing a Circuit Switched Call using Alternative Signalling at the Establishment of a Successful Session Set-up"; Specification 35 pgs.; 7 Drawing Sheets (Figs. 1-8).

(Continued)

*Primary Examiner* — Andrew Chriss

(74) *Attorney, Agent, or Firm* — Conley Rose, P.C.; J. Robert Brown, Jr.

(57) ABSTRACT

A method for diverting a Session Initiation Protocol (SIP) message is provided. The method includes receiving a SIP message comprising a Globally Routable User Agent Uniform Resource Identifier (GRUU). The method further includes evaluating a diversion rule including a condition comprising whether the first GRUU matches a second GRUU, wherein the second GRUU is contained in the condition.

10 Claims, 5 Drawing Sheets

OTHER PUBLICATIONS

Bakker, John-Luc, et al.; U.S. Appl. No. 12/189,683, filed Aug. 11, 2008; Title: "Communication Diversion with a Globally Routable User Agent Uniform Resource Identifier System and Method"; Specification 44 pgs.; 5 Drawing Sheets (Figs. 1-6).

J. Rosenberg; "Obtaining and Using Globally Routable User Agent (UA) URIs (GRUU) in the Session Initiation Protocol (SIP)"; Jun. 25, 2007; 42 pgs.

3GPP TR 23.808 V1.0.1; 3rd Generation Partnership Project; Technical Specification Group Services and System Aspects; Supporting Globally Routable User Agent URI in IMS; Report and Conclusions; Release 7; May 2006; 17 pgs.

PCT International Search Report; PCT Application No. PCT/US2008/072814; Mar. 2, 2009; 4 pgs.

PCT Written Opinion of the International Searching Authority; PCT Application No. PCT/US2008/072814; Mar. 2, 2009; 8 pgs.

Rosenberg, J.; Obtaining and Using Globally Routable User Agent (UA) URIs (GRUU) in the Session Initiation Protocol (SIP); draft-ietf-sip-gruu-13; Apr. 9, 2007; 41 pgs.

Munakata, M., et al.; SIP Privacy Clarified; draft-munakata-sip-privacy-clarified-00.txt; SIP; Feb. 23, 2007; 43 pgs.

ETSI TS 183 004 V1.1.1; Telecommunications and Internet Converged Services and Protocols for Advanced Networking (TISPAN); PSTN/ISDN Simulation Services; Communication Diversion (CDIV); Protocol Specification; Apr. 2006; 46 pgs.

Kyzivat, Registration Event Package Extension for Session Initiation Protocol (SIP) Globally Routable User Agent URIs (GRUUs), Oct. 19, 2006, The Internet Society; 15 pgs.

IEEE 100: The Authoritative Dictionary of IEEE Standards Terms, 2000, Standards Information Network IEEE Press, Seventh Edition, p. 872.

3GPP TR 23.808 V1.0.0; 3rd Generation Partnership Project; Technical Specification Group Services and System Aspects; Supporting Globally Routable User Agent URI in IMS; Report and Conclusions; Release 7; May 2006; 18 pgs.

Office Action dated Oct. 1, 2010; 68 pages, U.S. Appl. No. 12/189,683, filed Aug. 11, 2008.

PCT International Preliminary Report on Patentability; PCT Application No. PCT/US2008/072814; Oct. 20, 2009; 12 pgs.

EP Examination Report; EP Application No. 08797631.2; Dec. 22, 2010; 8 pgs.

PCT International Search Report; PCT Application No. PCT/US2008/072816; Mar. 20, 2009; 4 pgs.

PCT Written Opinion of the International Searching Authority; PCT Application No. PCT/US2008/072816; Mar. 20, 2009; 11 pgs.

EP Examination Report; EP Application No. 08827281.0; Sep. 16, 2010; 7 pgs.

Notice of Allowance and Fees Due dated Mar. 22, 2011, 17 pages, U.S. Appl. No. 12/189,683, filed Aug. 11, 2008.

Notice of Allowance with Interview Summary dated May 18, 2011, 22 pages, U.S. Appl. No. 12/189,683, filed Aug. 11, 2008.

PCT International Preliminary Report on Patentability; PCT Application No. PCT/US2008/72816; Feb. 16, 2010; 10 pages.

European Examination Report; EP Application No. 08797631.2; Sep. 19, 2011; 8 pgs.

* cited by examiner

SYSTEM AND METHOD FOR CONFIGURING AND EXECUTING COMMUNICATION DIVERSION WITH A GLOBALLY ROUTABLE USER AGENT UNIFORM RESOURCE IDENTIFIER

CROSS-REFERENCE TO RELATED APPLICATIONS

The present application claims priority to U.S. Provisional Patent Application No. 60/955,272, filed Aug. 10, 2007, by John-Luc Bakker, et al, entitled "System and Method for Configuring and Executing CDIV with GRUU" U.S. Provisional Patent Application No. 60/979,018, filed Oct. 10, 2007, by John-Luc Bakker, et al, entitled "Communication Diversion using GRUUS"; and U.S. Provisional Patent Application No. 60/985,902, filed Nov. 6, 2007, by John-Luc Bakker, et al., entitled "Communication Diversion and Notification using GRUUS", all of which are incorporated by reference herein as if reproduced in its entirety.

BACKGROUND

The IP (Internet Protocol) Multimedia Subsystem (IMS) is a standardized architecture for providing multimedia services and voice-over-IP calls to both mobile and fixed user agents (UAs). The Session Initiation Protocol (SIP) been standardized and governed primarily by the Internet Engineering Task Force (IETF) as a protocol for setting up and managing IMS-based calls. As used herein, the terms "user agent" and "UA" might in some cases refer to mobile devices such as mobile telephones, personal digital assistants, handheld or laptop computers, network nodes, and similar devices, etc., that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. In other cases, the term "UA" may refer to devices that have similar capabilities but that are not transportable, such as fixed line telephones, desktop computers, set-top boxes, or network nodes. When a UA is a network node, the network node could act on behalf of another function such as a wireless device or a fixed line device and simulate or emulate the wireless device or fixed line device. For example, for some wireless devices, the IMS SIP client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session. Also, the terms "UA", "user equipment", "UE", and "node" might be used synonymously herein.

Some nodes communicate in a circuit switched mode, wherein a dedicated communication path exists between two devices. For the duration of a call or session, all data exchanged between the two devices travels along the single path. Some nodes have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers.

Communications that take place via circuit switching can be said to occur in the circuit switched domain and communications that take place via packet switching can be said to occur in the packet switched domain. Within each domain, several different types of networks, protocols, or technologies can be used. In some cases, the same network, protocol, or technology can be used in both domains. The wireless communication networks may be based on Code Division Multiple Access (CDMA), Time Division Multiple Access (TDMA), Frequency Division Multiple Access (FDMA), Orthogonal Frequency Division Multiplexing (OFDM), or some other multiple access scheme. A CDMA-based network may implement one or more standards such as 3GPP2 IS-2000 (commonly referred to as CDMA 1x), 3GPP2 IS-856 (commonly referred to as CDMA 1xEV-DO), or 3GPP UMTS (Universal Mobile Telecommunications System). A TDMA-based network may implement one or more standards such as 3GPP Global System for Mobile Communications (GSM) or 3GPP General Packet Radio Service (GPRS).

GSM is an example of a wireless network standard that uses only the circuit switching mode. Examples of wireless network standards that use only packet switching include GPRS, CDMA 1x EV-DO, Worldwide Interoperability for Microwave Access (WiMAX), and Wireless Local Area Network (WLAN), which might comply with Institute of Electrical and Electronics Engineers (IEEE) standards such as 802.16, 802.16e, 802.11a, 802.11b, 802.11g, 802.11n, and similar standards. Examples of wireless network standards that may use both circuit switching and packet switching modes include CDMA 1x and UMTS. An example of an application-layer protocol that can be used in a packet switching wireless network is the Session Initiation Protocol (SIP). SIP has been standardized and governed primarily by the Internet Engineering Task Force (IETF). The IP (Internet Protocol) Multimedia Subsystem (IMS) is a packet switched technology that allows multimedia content to be transmitted between nodes.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
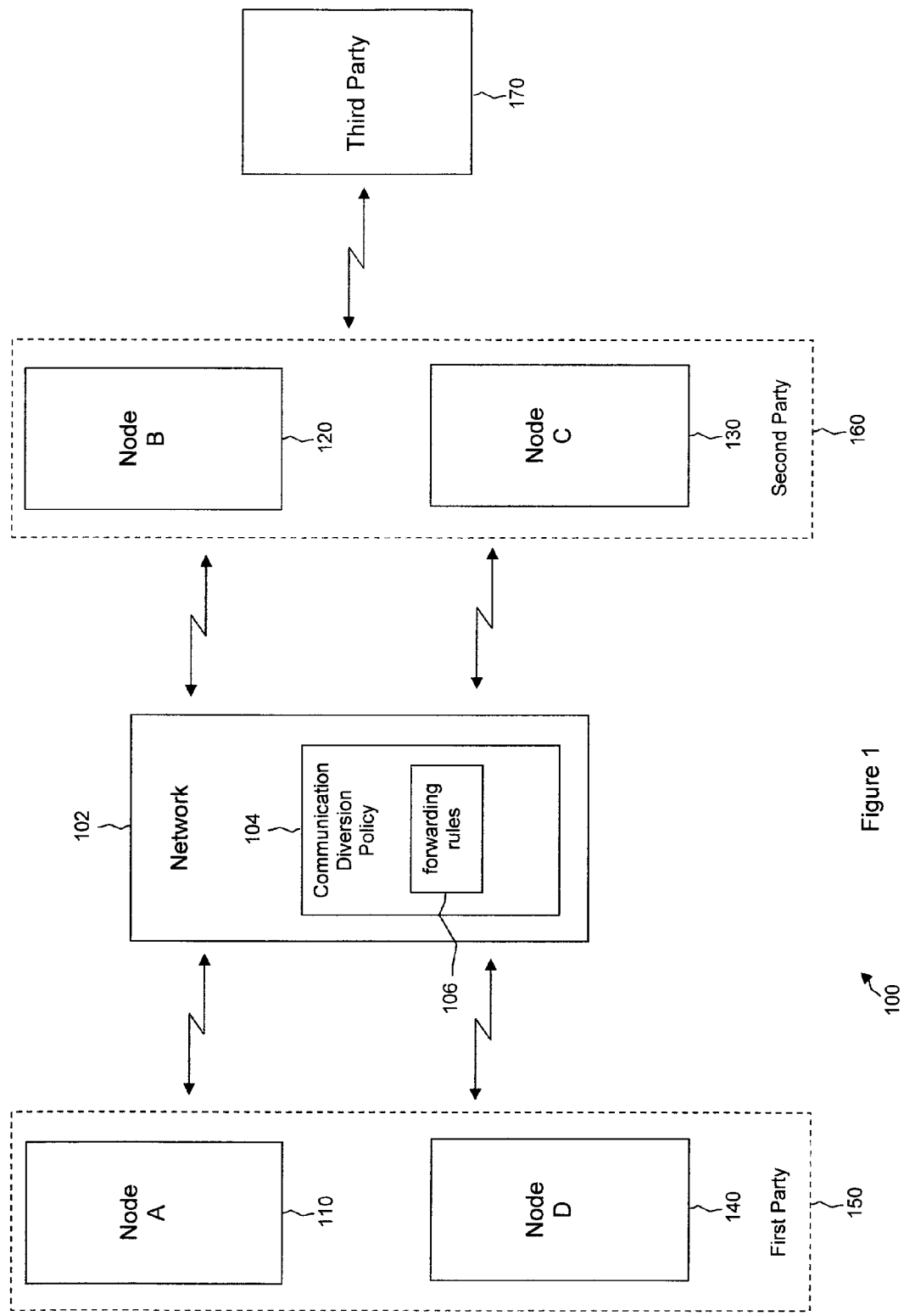
FIG. 1 is a block diagram of a telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a method for diverting a Session Initiation Protocol (SIP) message is provided. The method includes using at least one Globally Routable User Agent Uniform Resource Identifier (GRUU) to determine a recipient to which the SIP message is diverted.

In an alternative embodiment, a system implementing a Communication Diversion (CDIV) service is provided. The system includes a plurality of nodes, at least some of the nodes addressable by different Globally Routable User Agent Uniform Resource Identifiers (GRUUs).

In an alternative embodiment, a telecommunications network is provided. The telecommunications network includes a component configured to store a rule for diverting a SIP message based on a comparison of a first Globally Routable User Agent Uniform Resource Identifier (GRUU) specified by a node in the network and a second GRUU in an information header associated with the SIP message. When the first GRUU matches the second GRUU, the rule is followed to determine at least one of an intermediate target node from which the SIP message is diverted, a target node from which the SIP message is diverted, and a recipient node to which the SIP message is diverted.

In a packet switched network, multiple nodes or user agents might use the same address of record, such as a Uniform Resource Identifier (URI) or other public user identity. For example, a single user might have a mobile telephone, a laptop computer, and a home computer that all have the same URI. When a message is sent to the URI, the message might be directed to all three nodes substantially simultaneously. In some cases it might be desirable for a SIP message to be directed to only one of a plurality of nodes that share a single URI. To provide such a capability, packet switched networks can include a feature known as a GRUU (Globally Routable User Agent URI), which allows a SIP message, or other SIP based service, to be directed to a specific node when that node has the same URI as other nodes.

As an example, a user with a user name of 'user_abc' who receives wireless telecommunications services from a company called 'company_x' might have the URI 'user_abc@company_x.com'. A first device using this URI might have the GRUU 'user_abc@company_x.com;gr=urn:uuid:f81d4fae-7dec-11d0-a765-00a0c91e6bf6' and a second device using this URI might have the GRUU 'user_abc@company_x.com gr=urn:uuid:d84d4fbe-10dec-12d0-a768-a0a0c51a6bf6'. The portion of the GRUU that identifies a specific node, the URNs that follows the 'gr' parameter in these cases, can be referred to as the GR parameter value or GR parameter. The portion of the GRUU that corresponds to the URI, 'user_abc@company_x.com' in this case, can be referred to as the public user identity (PUID). For simplicity, hereinafter the gr parameter values or gr parameters will be given short and readable strings such as 'nodeA', 'nodeB', etc.

In an embodiment, a system is provided that allows the use of Communication Diversion (CDIV) in conjunction with GRUUs. CDIV is a script-based or rule-based service available for packet switched sessions such as SIP-based calls. CDIV can provide features such as call forwarding, call forwarding on busy, and similar options that allow a SIP session to be redirected to a node different from the node to which the call was originally directed. Any such forwarding or retargeting of a call will be referred to herein as diversion of the session. When the GRUU address feature is mapped to elements in a CDIV script, a session can be redirected to the GRUU of a node that, for example, shares a URI with other nodes. In addition, when a session is originated by a node that indicates itself or the circuit switched (CS) device that originated the call using a GRUU, the session can be handled differently depending on which of the nodes placed the call. Note that a CS device can also originate calls; when such a call is routed to a SIP based network, the call can be subjected to CDIV.

FIG. 1 is a block diagram of an embodiment of a system 100 that illustrate an implementation of CDIV for nodes that are addressable by their GRUUs. The system 100 includes a wireless telecommunications network 102. While the network 102 is depicted as a single entity, the network 102 might include a plurality of interconnected networks that allow a packet switched session to pass from one node to another. The network 102 includes a communication diversion policy 104 that might include one or more forwarding rules 106 for one or more nodes that specify how SIP messages are to be diverted based on the GRUUs of the nodes or CS devices from which the SIP messages originated or to which the SIP messages are targeted or re-targeted. The forwarding rules 106 in the communication diversion policy 104 might be CDIV-based scripts that have been modified to support URIs that include a GR parameter. In particular, if the rule 106 is compliant to Internet Engineering Task Force (IETF) Request for Comments (RFC) 4745 and Open Mobile Alliance (OMA) common policy extensions, the modification includes matching an "identity" condition (RFC 4745 and OMA common policy extensions) value or similar condition values in OMA common policy extensions to the Contact header field value if said condition values include a GR parameter. The network 102 might also include appropriate processing components to implement the communication diversion policy 104. The communication diversion policy 104 and the components that implement the communication diversion policy 104 might reside on an application server or a similar component within the network 102.

The network 102 also includes a plurality of nodes under the control of a plurality of call origination parties and/or call target parties. Node A 110 and node D 140 are under the control of a first party 150 and share a first URI but have different GR parameters. (It should be noted that multiple nodes sharing a PUID is not a precondition for using GRUU). Node B 120 and node C 130 are under the control of a second party 160 and share a second URI but have different GR parameters. For example, if the first party 150 has a URI of 'userAB@companyXY', then node A 110 might have a GRUU of 'userAB@companyXY;gr=nodeA and node D 140 might have a GRUU of 'userAB@companyXY;gr=nodeD. If the second party 160 has a URI of 'userBC@companyYZ', then node B 120 might have a GRUU of 'userBC@companyYZ;gr=nodeB and node C 130 might have a GRUU of 'userBC@companyYZ;gr=nodeC. A third party 170 that might include a plurality of nodes might also be present.

In the following discussion, it will be assumed that the first party 150 causes a SIP message to be sent in a network towards the second party 160. The SIP message may used to establish a SIP-based call, which may be diverted based on one or more GRUUs of the nodes under the control of the first party 150 and/or the second party 160. The following discussion relates to SIP-based calls; however, considerations similar to the following discussion regarding calls would apply to other SIP messages originated by and/or targeted to other parties shown in the system 100. The call might be initiated by the first party 150 or might be initiated by another source, sent to the first party 150, and then forwarded by the first party 150 to the second party 160. In either case, the first party 150 will be considered herein to be the originator of the call. The node to which the originator directs the SIP message will be referred to herein as the target of the call. The node to which the SIP message is ultimately diverted will be referred to herein as the recipient of the call. The device of recipient of the call might also be addressed by its GRUU.

In an embodiment, a party that wishes to implement CDIV based on one or more GRUUs might specify in the communication diversion policy 104 the SIP URIs including GR parameters that pertain to the nodes that originate the SIP messages, the nodes to which the SIP messages are targeted, and/or the nodes to which the SIP messages are to be diverted. For instance, if the second party 160 wished to have SIP messages from the first party 150 forwarded based on the GRUUs of the first party 150 and/or based on the GRUUs of the second party 160, the second party 160 might send a message to the network 102 establishing the forwarding rules 106 in the communication diversion policy 104 that will divert SIP messages to the appropriate recipient.

As an example, the forwarding rules 106 in the communication diversion policy 104 might be set to specify that any SIP messages that are targeted to the GRUU of node B 120 are to be forwarded to node C 130, regardless of the node that originates the calls. In another example, the forwarding rules 106 might be set to specify that any SIP messages that are originated by the GRUU of node A 110 are to be forwarded to node B 120, regardless of the node of the second party 160 to which the SIP messages are targeted. In another example, the forwarding rules 106 might be set to specify that any calls originating from either the GRUU of node A 110 or the GRUU of node D 140 and targeted to either the GRUU of node B 120 or the GRUU of node C 130 are to be forwarded to the third party 170. Other examples of forwarding rules 106 that could be established based on the GRUUs of the originating nodes and/or the GRUUs of the target nodes may be apparent to one of skill in the art.

When a SIP message is transmitted to a node for which one or more forwarding rules 106 have been established, information in the SIP message's 'To' header field, 'From' header field, 'Contact' header field, 'P-Asserted-Identity' header field (RFC 3325), 'History' header field, or some other well known SIP-based part of the start-line, message-header, message-body in the SIP message can be examined for the presence of one or more SIP URIs including GR parameters. If one or more SIP URIs including GR parameters are present in the SIP message, those SIP URIs including GR parameters are compared to the SIP URIs including GR parameters in the communication diversion policy 104 of the target node. If no SIP URIs including GR parameters are present in the SIP message, or if the SIP URIs including GR parameters that are present do not match any SIP URIs including GR parameters in the communication diversion policy 104, or if no other forwarding rule matches as described in RFC 4745, the SIP message (e.g. SIP request) is sent in a standard manner to the target node. It should be noted that a SIP URI can be wildcarded.

If one or more SIP URIs including GR parameters in the SIP message do match one or more SIP URIs including GR parameters in the communication diversion policy 104, subject to other conditions and evaluations per RFC 4745, the forwarding rules 106 established for the target node in the communication diversion policy 104 are implemented. That is, if there is a rule in the communication diversion policy 104 that applies to a SIP URI including GR parameter in the information part of a SIP message, the SIP message might be diverted based on that SIP URI including GR parameter.

In a first example of such a diversion, call forwarding might be based on the node to which a call is targeted, with no consideration of the originating node. For instance, if node A 110 wished to place a call specifically to node B 120 rather than to the general URI of the second party 160, node A 110 might use the GRUU of node B 120 to target the call to node B 120. However, the second party 160 may wish for calls targeted to node B 120 to be forwarded to node C 130, regardless of the originating node. The second party 160, in such a case, might send appropriate instructions to the network 102 to establish the communication diversion policy 104 such that all calls that are targeted to node B 120 should be forwarded to node C 130. The SIP message from node A 110 would be matched against rules and conditions as generally described in RFC 4745, and it is determined if the SIP URI including GR parameter for node B 120 is present in the call's 'To' header (or in a similar SIP-based data field, e.g., the P-Asserted-Identity header field in SIP messages transmitted within the IM CN subsystem or IMS). Since the SIP URI including GR parameter for node B 120 would be present, subject to other conditions and evaluations, the forwarding rule 106 established by the second party 160 would be followed and the call would be diverted to node C 130.

In a second example, call forwarding might be based on the node from which a call originates, with no consideration of the target node. For instance, the second party 160 might send appropriate instructions to the network 102 to establish the communication diversion policy 104 such that any calls that are sent from node A 110 should be sent only to node B 120, regardless of the node or nodes to which the calls are targeted. If node A 110 placed a call specifically to node B 120, specifically to node C 130, or to the second party 160 in general, the call's 'Contact' header field (or a similar SIP-based data field) would be examined to determine if the SIP URI including GR parameter for node A 110 is present. Since the SIP URI including GR parameter for node A 110 would be present in the 'Contact' header in such a case, subject to other conditions and evaluations, the forwarding rule 106 established by the second party 160 for calls from node A 110 would be followed and the call would be sent only to node B 120.

In a third example, call forwarding might be based on a combination of the originating node and the target node. For instance, the second party 160 might specify that all calls sent from node A 110 and targeted to node B 120 should be diverted to node C 130. Calls sent from node D 140 and targeted to node C 130 might be diverted to node B 120. In these cases, both the 'To' header and the 'Contact' header (or similar headers) of a call from the first party 150 to the second party 160 might be examined for the SIP URIs including GR parameters that correspond to node A 110, node B 120, node C 130, and node D 140. If the designated SIP URIs including GR parameters are found in the headers, subject to other conditions and evaluations, the applicable forwarding rules 106 would be followed.

In a fourth example, calls from the first party 150 might be forwarded to the third party 170 rather than or in addition to being forwarded to a node under the control of the second party 160. For instance, the second party 160 could establish a forwarding rule 106 in the communication diversion policy 104 that states that calls from node A 110 targeted to node B 120 should be forwarded to the third party 170 or to a specific node under the control of the third party 170. A further rule 106 could state that calls from node A 110 targeted to node C 130 should be sent to node C 130 and also forwarded to the third party 170. A further rule 106 could state that for calls from node D 140, no forwarding should occur and the calls should be sent to their target node. One of skill in the art might recognize other possible rules 106 or combinations of rules 106 for diverting calls based on the GRUUs of node A 110, node B 120, node C 130, node D 140, and the node or nodes under the control of the third party 170.

Figure 2:
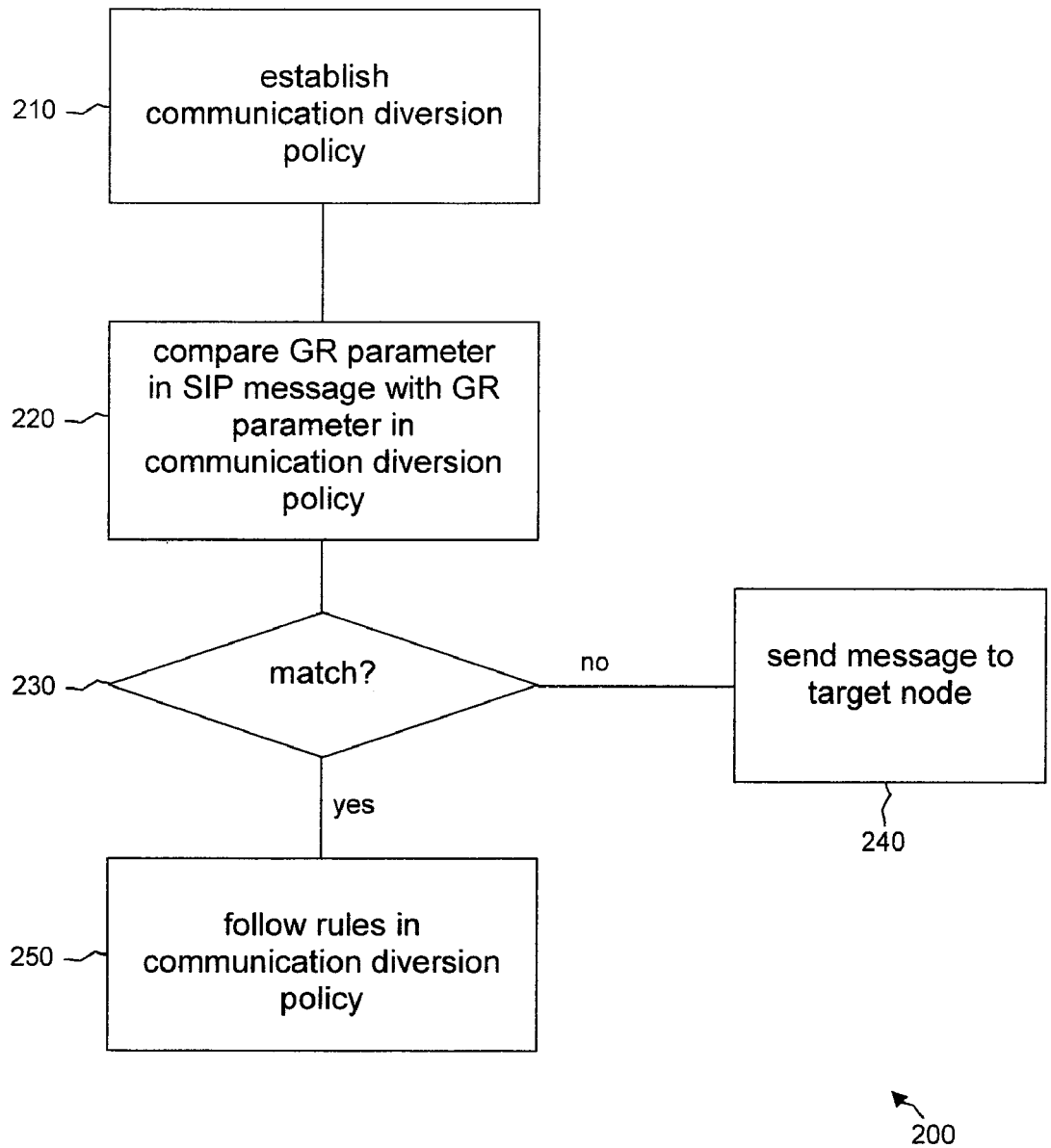
FIG. 2 is a block diagram of a method for diverting a SIP message (i.e. SIP request or response) according to an embodiment of the disclosure.

FIG. 2 illustrates an embodiment of a method 200 for implementing CDIV based on a GRUU. At block 210, a communication forwarding policy based on one or more GRUUs is established. The SIP URIs including GR parameters that will be used as the basis for diversion decisions and one or more rules for diverting communications based on the SIP URIs including GR parameters are specified at this point. At block 220, when a SIP-based message is transmitted, a SIP URI including GR parameter in the SIP message might be compared to a SIP URI including GR parameter in the forwarding policy. At block 230, subject to other evaluations/conditions, a decision is made based on whether a match is found between the SIP URI including GR parameter in the SIP message and the SIP URI including GR parameter in the forwarding policy. At block 240, if no match is found, subject to other evaluations/conditions, the SIP message is sent to its target node. At block 250, if a match is found, subject to other evaluations/conditions, one or more rules in the forwarding policy are followed and the SIP message might be diverted to a recipient node other than its target node.

The following provides additional details and further embodiments of the present disclosure:

4.5.2.6.2 Setting of the Diversion Parameters by the AS
4.5.2.6.2.1 Overview

After checking the limit of diversions the following settings of the INVITE request shall be performed.

4.5.2.6.2.2 First Diversion; No History Header Received

When this is the first diversion the communication has undergone, the following information is to be set in the retargeted request:
  the diverting parties address;
  the diverted-to party address;
  diversion information.

The following header fields shall be included or modified with the specified values:
  a) The Request URI—shall be set to the URI where the communication is to be diverted to (see <target> element in clause 4.9).
  b) The History-Info Header field—Two hist-info entries that shall be generated.
    b.1) The first entry includes the hi-targeted-to-uri of the served user.
      The privacy header "history" shall be escaped within the hi-targeted-to-uri, if:
        If the served user wishes privacy (e.g. the served user is subscribed to the OIR Service); or
        if the served used has the subscription option "Served user allows the presentation of his/her URI to diverted-to user" set to false.
      The Index is set to index=1 according to the rules specified in RFC 4244.
    b.2) The second entry includes the hi-targeted-to-uri of the address were the communication is diverted to. The index is set to index=1.1, The cause-param parameter (redirecting reason and redirecting indicator) included in the history-info header field shall be set according to the diversion conditions and notification subscription option.
      The mapping between the diversion conditions and the coding of the cause-param parameter is as follows:
        Communication forwarding busy, the cause value "486" as defined by RFC 4458 shall be used.
        Communication forwarding no reply, the cause value "408" as defined by RFC 4458 shall be used.
        Communication forwarding unconditional, the cause value "302 as defined by RFC 4458 shall be used".
        Communication deflection (Immediate response), the cause value "480" as defined by RFC 4458 shall be used".
        Communication Forwarding Not Logged in, the cause value "404" as defined by RFC 4458 shall be used.
        Communication Forwarding on Subscriber Not reachable, the cause value "503" as defined by RFC 4458 shall be used.
      according to the rules specified in RFC 4244.
  c) The To header field—If the served user does not want to reveal its identity to the diverted-to party, then the To header shall be changed the URI where the communication is diverted to. The served user does not want to reveal its identity when one of the following conditions holds true:
    If the served user wishes privacy (e.g. the served user is subscribed to the OIR Service); or
    if the served used has the subscription option "Served user allows the presentation of his/her URI to diverted-to user" set to false.
    In all other cases the To header shall not be changed.
      Communication Forwarding on Subscriber Not reachable, the cause value "503" as defined by RFC 4458 shall be used.
    The Index shall be incremented according to the Basic Forwarding rules specified in section 4.3.3.1.3 "Indexing in the History-Info Header" of RFC 4244 the new level index "1" shall be used.
  c) To header—If the served user does not want to reveal its identity to the diverted-to party, then the To header shall be changed the URI where the communication is diverted to. The served user does not want to reveal its identity when one of the following conditions holds true:
    if the served user wishes privacy (e.g. the served user is subscribed to the OIR Service); or
    if the served used has the subscription option "Served user allows the presentation of his/her URI to diverted-to user" set to false.
    In all other cases the To header shall not be changed.

4.9.2 XML Schema

---

4.9.2 XML Schema

<?xml version="1.0" encoding="UTF-8"?>

-continued

4.9.2 XML Schema

```
<xs:schema xmlns:xs="http://www.w3.org/2001/XMLSchema"
    xmlns:ss="http://uri.etsi.org/ngn/params/xml/simservs/xcap"
    xmlns:cp="urn:ietf:params:xml:ns:common-policy"
    xmlns:ocp="urn:oma:xml:xdm:common-policy"
    targetNamespace="http://uri.etsi.org/ngn/params/xml/simservs/xcap"
    elementFormDefault="qualified"
    attributeFormDefault="unqualified">
    <xs:include schemaLocation="simservs.xsd"/>
    <!-- import common policy definitions -->
    <xs:import namespace="urn:ietf:params:xml:ns:common-policy" schemaLocation="common-policy.xsd"/>
    <!-- import OMA common policy extensions from
http://www.openmobilealliance.org/tech/profiles/xdm_CommonPolicy-V1_0_1.xsd -->
    <xs:import namespace="urn:oma:xml:xdm:common-policy" schemaLocation="xdm_CommonPolicy-V1_0_1.xsd"/>
    <!-- communication diversion rule set based on the common policy rule set.-->
    <xs:element name="communication-diversion" substitutionGroup="ss:absService">
        <xs:annotation>
            <xs:documentation>This is the communication diversion configuration document.</xs:documentation>
        </xs:annotation>
        <xs:complexType>
            <xs:complexContent>
                <xs:extension base="ss:simservType">
                    <xs:sequence>
                        <!-- add service specific elements here -->
                        <xs:element ref="cp:ruleset" minOccurs="0"/>
                    </xs:sequence>
                </xs:extension>
                <!-- service specific attributes can be defined here-->
            </xs:complexContent>
        </xs:complexType>
    </xs:element>
    <!-- communication diversion specific extensions to IETF common policy actions-->
    <xs:element name="forward-to" type="ss:forward-to-type"/>
    <!-- communication diversion specific type declarations -->
    <xs:complexType name="forward-to-type">
        <xs:sequence>
            <xs:element name="target" type="xs:anyURI"/>
            <xs:element name="notify-caller" type="xs:boolean" default="true" minOccurs="0"/>
```

4.5.2.6.2.3 Subsequent Diversion; a History Header Received

When this is the second or greater diversion the communication has undergone, a new history-info entry shall be added to the History-Info header field according to the rules defined in RFC 4244. The following information has to added to the retargeted request:

the diverted-to party address;
diversion information.

The following header fields shall be included or modified with the specified values
a) Request URI—shall be set to the URI where the communication is to be diverted to (see <target> element in Clause 4.9).
b) History-Info Header The history entry representing the served user may be modified. One history entry is added.
  b.1) The history entry representing the served user privacy header "history" shall be escaped within the hi-targeted-to-uri, if:
    If the served user wishes privacy (e.g. the served user is subscribed to the OIR Service); or
    if the served used has the subscription option "Served user allows the presentation of his/her URI to diverted-to user" set to false.
    If the history is already escaped with the correct privacy value no modification is needed.
    In all other cases the history entry representing the served user shall not be changed.
  b.2) A history entry shall be added where the hi-targeted-to-uri shall be set to the public user identity were the communication is diverted to. Cause-param parameter (redirecting reason) included in the History-Info header field shall be set according to the diversion conditions and notification subscription option.

The mapping between the diversion conditions and the coding of the cause-param parameter is as follows:

Communication forwarding busy, the Cause value "486" as defined by RFC 4458 shall be used.

Communication forwarding no reply, the Cause value "408" as defined by RFC 4458 shall be used.

Communication forwarding unconditional, the Cause value "302" as defined by RFC 4458 shall be used.

Communication deflection (Immediate response), the Cause value "480" as defined by RFC 4458.

Communication Forwarding Not Logged in, The Cause value "404" as defined by RFC 4458 shall be used.

4.9.2 XML Schema 4.9.2 XML Schema

```
<?xml version="1.0" encoding="UTF-8"?>
<xs:schema xmlns:xs="http://www.w3.org/2001/XMLSchema"
        xmlns:ss="http://uri.etsi.org/ngn/params/xml/simservs/xcap"
        xmlns:cp="urn:ietf:params:xml:ns:common-policy"
        xmlns:ocp="urn:oma:xml:xdm:common-policy"
        targetNamespace="http://uri.etsi.org/ngn/params/xml/simservs/xcap"
        elementFormDefault="qualified"
        attributeFormDefault="unqualified">
    <xs:include schemaLocation="simservs.xsd"/>
    <!-- import common policy definitions -->
    <xs:import namespace="urn:ietf:params:xml:ns:common-policy" schemaLocation="common-policy.xsd"/>
    <!-- import OMA common policy extensions from
http://www.openmobilealliance.org/tech/profiles/xdm_CommonPolicy-V1_0_1.xsd -->
    <xs:import namespace="urn:oma:xml:xdm:common-policy" schemaLocation="xdm_CommonPolicy-V1_0_1.xsd"/>
    <!-- communication diversion rule set based on the common policy rule set.-->
    <xs:element name="communication-diversion" substitutionGroup="ss:absService">
        <xs:annotation>
            <xs:documentation>This is the communication diversion configuration document.</xs:documentation>
        </xs:annotation>
        <xs:complexType>
            <xs:complexContent>
                <xs:extension base="ss:simservType">
                    <xs:sequence>
                        <!-- add service specific elements here-->
                        <xs:element ref="cp:ruleset" minOccurs="0"/>
                    </xs:sequence>
                </xs:extension>
                <!-- service specific attributes can be defined here -->
            </xs:complexContent>
        </xs:complexType>
    </xs:element>
    <!-- communication diversion specific extensions to IETF common policy actions-->
    <xs:element name="forward-to" type="ss:forward-to-type"/>
    <!-- communication diversion specific type declarations -->
    <xs:complexType name="forward-to-type">
        <xs:sequence>
            <xs:element name="target" type="xs:anyURI"/>
            <xs:element name="notify-caller" type="xs:boolean" default="true" minOccurs="0"/>
            <xs:element name="reveal-identity-to-caller" type="xs:boolean" default="true" minOccurs="0"/>
            <xs:element name="notify-served-user" type="xs:boolean" default="false" minOccurs="0"/>
            <xs:element name="notify-served-user-on-outbound-call" type="xs:boolean" default="false" minOccurs="0"/>
            <xs:element name="reveal-identity-to-target" type="xs:boolean" default="true" minOccurs="0"/>
            <xs:element name="reveal-GRUU-to-caller" type="xs:boolean" default="false" minOccurs="0"/>
            <xs:element name="reveal-caller-GRUU-to-target" type="xs:boolean" default="false" minOccurs="0"/>
            <xs:element name="reveal-served-user-GRUU-to-target" type="xs:boolean" default="false" minOccurs="0"/>
        </xs:sequence>
    </xs:complexType>
</xs:schema>
```

Figure 3:
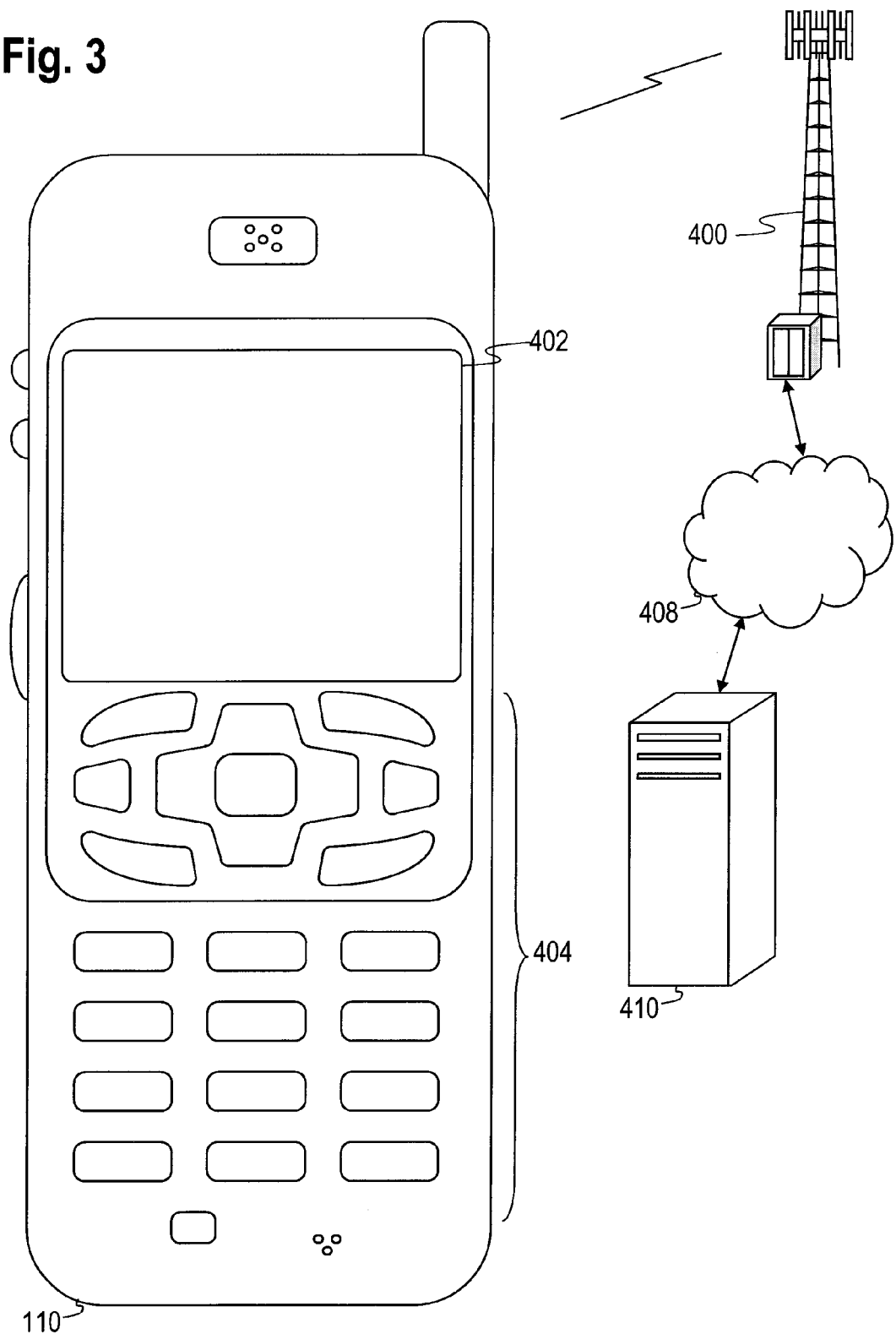
FIG. 3 is a diagram of a wireless communications system including a node operable for some of the various embodiments of the disclosure.

FIG. 3 illustrates a wireless communications system including an embodiment of one of the nodes of FIG. 1, in this case, node A 110. A similar illustration and description could apply to node B 120, node C 130, or node D 140. The node 110 is operable for implementing aspects of the disclosure, but the disclosure should not be limited to these implementations. Though illustrated as a mobile phone, the node 110 may take various forms including a wireless handset, a pager, a personal digital assistant (PDA), a portable computer, a tablet computer, or a laptop computer. Many suitable devices combine some or all of these functions. In some embodiments of the disclosure, the node 110 is not a general purpose computing device like a portable, laptop or tablet computer, but rather is a special-purpose communications device such as a mobile phone, wireless handset, pager, or PDA. In another embodiment, the node 110 may be a portable, laptop or other computing device. The node 110 may support specialized activities such as gaming, inventory control, job control, and/or task management functions, and so on.

The node 110 includes a display 402. The node 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The node 110 may present options for the user to select, controls for the user to actuate, and/or cursors or other indicators for the user to direct. The node 110 may further accept data entry from the user, including numbers to dial or various parameter values for configuring the operation of the node 110. The node 110 may further execute one or more software or firmware applications in response to user commands. These applications may configure the node 110 to perform various customized functions in response to user interaction. Additionally, the node 110 may be programmed and/or configured over-the-air, for example from a wireless base station, a wireless access point, or a peer node 110.

Among the various applications executable by the node 110 are a web browser, which enables the display 402 to show a web page. The web page may be obtained via wireless communications with a wireless network access node, a cell tower, a peer node 110, or any other wireless communication network or system 400. The network 400 is coupled to a wired network 408, such as the Internet. Via the wireless link and the wired network, the node 110 has access to information on various servers, such as a server 410. The server 410 may provide content that may be shown on the display 402. Alternately, the node 110 may access the network 400 through a peer node 110 acting as an intermediary, in a relay type or hop type of connection.

Figure 4:
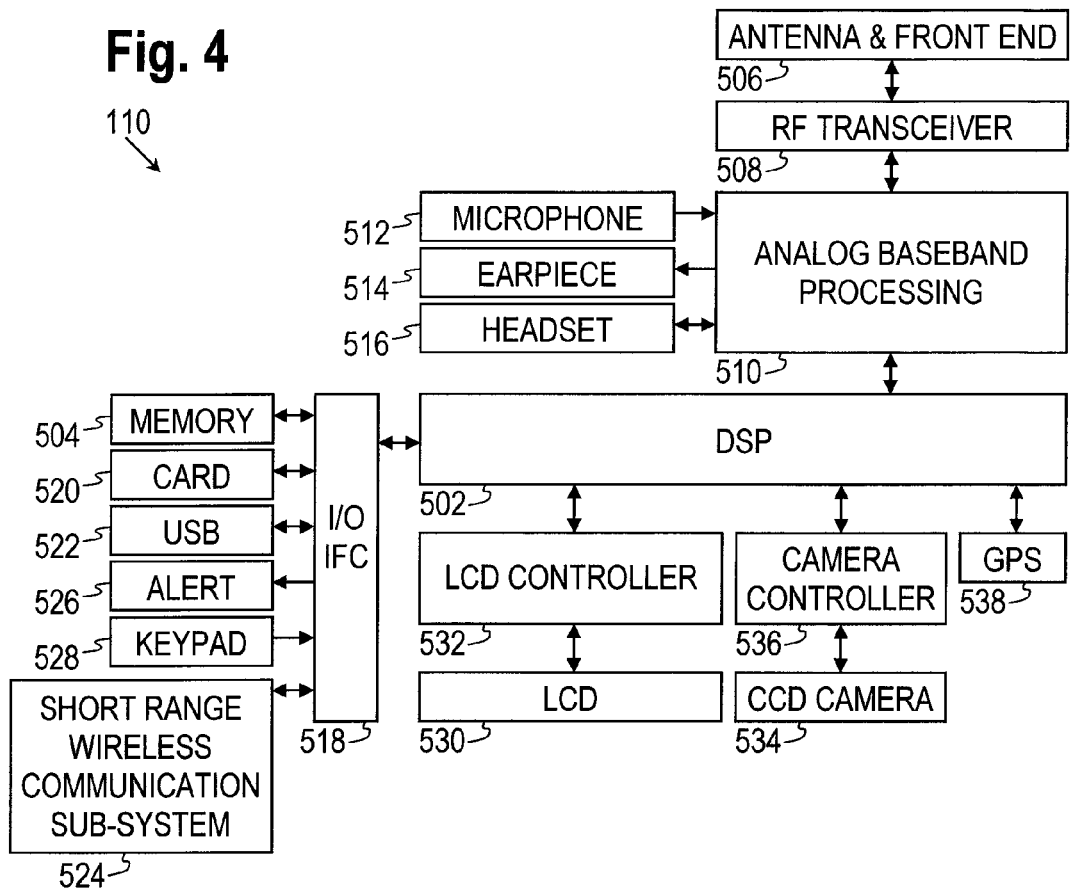
FIG. 4 is a block diagram of a node operable for some of the various embodiments of the disclosure.

FIG. 4 shows a block diagram of the node 110. While a variety of known components of nodes 110 are depicted, in an embodiment a subset of the listed components and/or additional components not listed may be included in the node 110. The node 110 includes a digital signal processor (DSP) 502 and a memory 504. As shown, the node 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the node 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the node 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the node 110 to send and receive information from a cellular network or some other available wireless communications network or from a peer node 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the node 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the node 110 and may also enable the node 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the node 110 to communicate wirelessly with other nearby mobile devices and/or wireless base stations.

The input/output interface 518 may further connect the DSP 502 to the alert 526 that, when triggered, causes the node 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the node 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the node 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the node 110 to determine its position. Various other peripherals may also be included to provide additional functions, e.g., radio and television reception.

Figure 5:
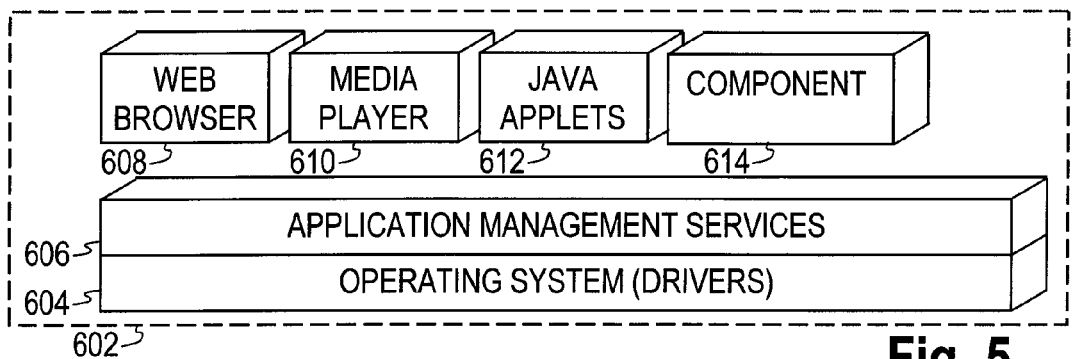
FIG. 5 is a diagram of a software environment that may be implemented on a node operable for some of the various embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the node hardware with standardized interfaces that are accessible to application software. The operating system drivers 604 include application management services ("AMS") 606 that transfer control between applications running on the node 110. Also shown in FIG. 5 are a web browser application 608, a media player application 610, and Java applets 612. The web browser application 608 configures the node 110 to operate as a web browser, allowing a user to enter information into forms and select links to retrieve and view web pages. The media player application 610 configures the node 110 to retrieve and play audio or audiovisual media. The Java applets 612 configure the node 110 to provide games, utilities, and other functionality A component 614 might provide functionality related to the use of GRUUs with CDIV.

Figure 6:
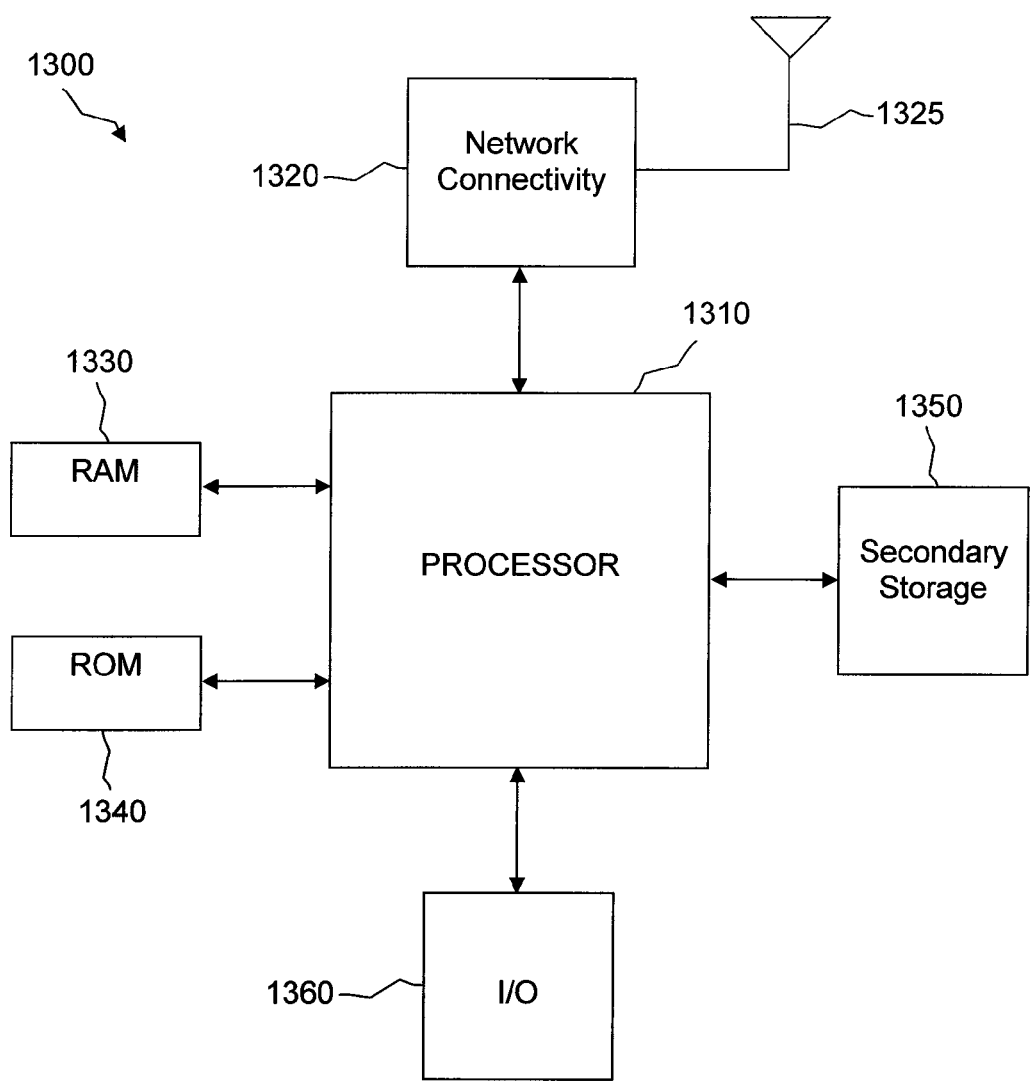
FIG. 6 illustrates a processor and related components suitable for implementing the several embodiments of the present disclosure.

The nodes of FIG. 1 may include a processing component that is capable of executing instructions related to the actions described above. FIG. 6 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 110, such as the display 402 and the input 404.

European Telecommunications Standards Institute (ETSI) Technical Specification (TS) 183 004: "Telecommunications and Internet converged Services and Protocols for Advanced Networking (TISPAN)" is incorporated herein by reference for all purposes. Also incorporated herein by reference for all purposes are IETF RFCs 3325, 4244, 4458, and 4745.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for diverting Session Initiation Protocol (SIP) messages using rules, the method comprising:
   receiving a SIP message including a first field, the first field comprising a first Globally Routable User Agent Uniform Resource Identifier (GRUU) identifying a node, wherein the first GRUU comprises a GR URI parameter and a GR parameter value;
   evaluating a communication policy comprising a diversion rule, the diversion rule including a condition, the condition comprising matching the first GRUU to a second GRUU, wherein the second GRUU is contained in the condition and wherein the communication policy further comprises a target field set to a URI; and
   in response to evaluating the diversion rule, diverting the SIP message when the first GRUU matches the second GRUU, the diverting comprising setting a second field of the SIP message to the URI of the target field.

2. The method of claim 1, wherein the first GRUU further comprises a public user identity (PUID).

3. The method of claim 1, wherein the first GRUU is a GRUU of at least one of:
   a first node that originates the SIP message;
   a second node to which the SIP message is targeted;
   a third node to which the SIP message is diverted; or
   an intermediate node to which the SIP message was targeted;
   and wherein the second GRUU is a GRUU of at least one of:
   a first node that originates the SIP message;
   a second node to which the SIP message is targeted;
   a third node to which the SIP message is diverted; or
   an intermediate node to which the SIP message was targeted.

4. The method of claim 1, wherein the first GRUU is located in at least one of:
   a Contact header field in the SIP message;
   a History-Info header field in the SIP message;
   a P-Asserted-Identity header field in the SIP message;
   a To header field in the SIP message; and
   a From header field in the SIP message.

5. The method of claim 1, wherein the SIP message is a SIP INVITE request.

6. The method of claim 1, wherein the method is implemented through a modification of a Communication Diversion (CDIV) configuration.

7. A telecommunications network, comprising:
   a component including a processor configured to execute instructions on a storage device in order to:
   receive a Session Initiation Protocol (SIP) message including a first field, the first field comprising a first Globally Routable User Agent Uniform Resource Identifier (GRUU) identifying a node, wherein the first GRUU comprises a GR parameter and a GR parameter value;
   evaluate a communication policy comprising a diversion rule, the diversion rule including a condition comprising whether the first GRUU matches a second GRUU, wherein the second GRUU is contained in the condition, and wherein the communication policy further comprises a target field set to a URI; and
   in response to evaluating the diversion rule, diverting the SIP message when the first GRUU matches the second GRUU, the diverting comprising setting a second field of the SIP message to the URI of the target field.

8. The telecommunications network of claim 7, wherein the first GRUU further comprises a public user identity (PUID).

9. The telecommunications network of claim 7, wherein the first GRUU is at least one of:
   a first node that originates the SIP message;
   a second node to which the SIP message is targeted;
   a third node to which the SIP message is diverted; or
   an intermediate node to which the SIP message was targeted;
   wherein the first GRUU is located in at least one of:
   a Contact header field in the SIP message;
   a History-Info header field in the SIP message;
   a P-Asserted-Identity header field in the SIP message;
   a To header field in the SIP message; or
   a From header field in the SIP message;
   and wherein the second GRUU is a GRUU of at least one of:

a first node that originates the SIP message;
a second node to which the SIP message is targeted;
a third node to which the SIP message is diverted; or
an intermediate node to which the SIP message was targeted.

10. The telecommunications network of claim 8, wherein the SIP message is a SIP INVITE request that is diverted through a modification of a Communication Diversion (CDIV) configuration.

\* \* \* \* \*